United States Patent [19]
Redhead

[11] 4,294,168
[45] Oct. 13, 1981

[54] INSERTABLE ARTICLE FOR ALTERING THE CURE RATE AND CHEMICAL COMPOSITION OF AN OBJECT

[76] Inventor: Walden K. Redhead, 3831 E. McGilvra St., Seattle, Wash. 98112

[21] Appl. No.: 167,773

[22] Filed: Jul. 10, 1980

[51] Int. Cl.³ .......................... A23B 4/02; A23L 1/22
[52] U.S. Cl. ...................... 99/494; 99/419; 99/516; 99/532; 99/535; 111/92
[58] Field of Search ............... 99/345, 419, 494, 516, 99/532–536; 17/25; 47/1 R, 57.5; 111/92

[56] References Cited
U.S. PATENT DOCUMENTS

| | | | |
|---|---|---|---|
| 725,916 | 4/1903 | Bailey | 99/532 |
| 774,394 | 11/1904 | Peter | 99/494 |
| 2,776,634 | 1/1957 | Morton | 111/92 |
| 3,483,810 | 12/1969 | Peters et al. | 99/532 |
| 3,584,683 | 6/1971 | Gordon | 99/419 |
| 4,170,933 | 10/1979 | Meamber | 99/419 |

Primary Examiner—Philip R. Coe
Assistant Examiner—Timothy F. Simone
Attorney, Agent, or Firm—Victor J. Evans & Co.

[57] ABSTRACT

Disclosed herein is an insertable article for altering the cure rate and chemical composition of an object thus pierced which includes an elongated shaft, preferably formed from heat conductive material, and recesses extending along the length of the shaft provided with areas around the recess for the disposition of chemicals therein. The shaft has a terminus which is pointed for ease in insertion into the object, and the support areas and recesses are so disposed on an outer face of the shaft that the cure rate of the article and its chemical configuration is altered by a gradual leaching outwardly of the chemicals and a cure rate pattern altered by the heat conductive shaft.

7 Claims, 4 Drawing Figures

U.S. Patent    Oct. 13, 1981    4,294,168
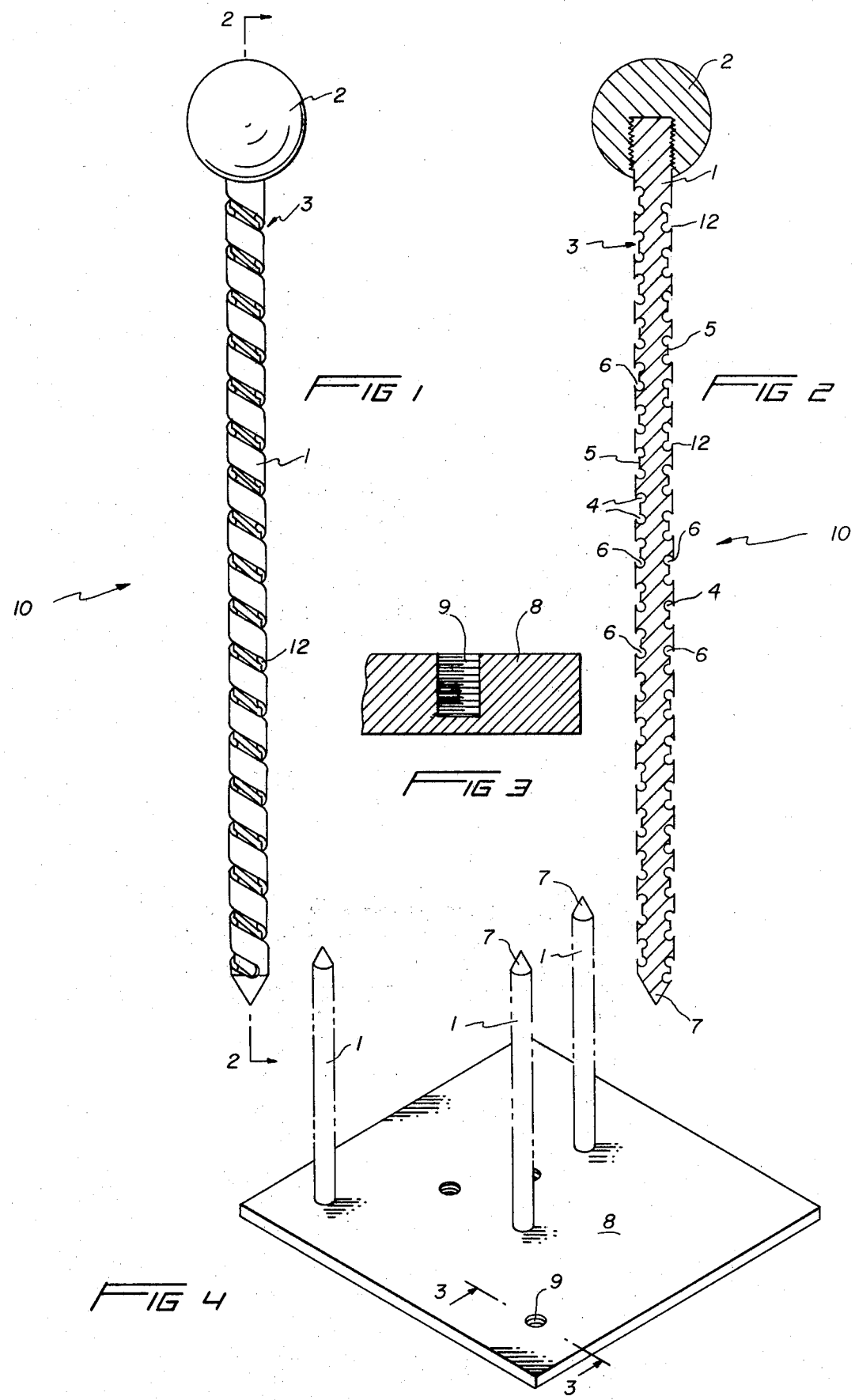

INSERTABLE ARTICLE FOR ALTERING THE CURE RATE AND CHEMICAL COMPOSITION OF AN OBJECT

BACKGROUND OF THE INVENTION

It has long been known that articles to be cured, heated, or quenched can have various and diverse properties depending upon the controls provided during this change. For example, a temperature differential between an inner portion and outer portion of an object being subjected to a process may exhibit different properties from its inner core to its outer periphery as a function of the temperature gradient associated with the process. For example, a mold that is juxtaposed to an article to be cured may have a certain temperature differential that will alter the physical properties of the skin most closely associated with the mold itself. Likewise, the insertion of articles within the core of the object can modify the internal properties.

The following patents reflect the state of the art of which applicant is aware in so far as they appear to be germane to the patent process:
 Peters: U.S. Pat. No. 3,483,810
 Bailey: U.S. Pat. No. 725,916
 Peter: U.S. Pat. No. 774,394
 Morton: U.S. Pat. No. 2,776,634

Peters et al U.S. Pat. No. 3,483,810 teaches the use of a syringe for tenderizing food in which the degree of insertion within the food is controlled by means of a stop member and in which the substance to be inserted therein is introduced initially prior to heating, and therefore the inserted portion cannot alter the cure rate.

Peter teaches the use of a meat salting apparatus in which a plunger is provided having an outer wall and an inner tube for the foreceable injection therein of salt, and the device is so constructed that a support carriage is necessary in order to assure the disposition of the salt within the article.

Bailey teaches use of a curing tube for pickling meat in which an openable cartridge has inserted therein a curing substance so that once inserted within the meat, the meat will gradually absorb the pickling matter altering the chemical composition thereof.

Morton teaches the use of an applicator for feeding substances into readily penetratable material such as earth and food products in which a planar elongate spike is provided with notches or apertures adapted to receive a substance therein so that upon insertion into the earth or food products, and subsequent twisting, substances are retained behind once the spike like object is retracted.

By way of contrast, the instant application claims and is directed to an article adapted to be inserted within an object to alter the cure rate and chemical composition thereof in which a recess is provided along the length of a shaft and is provided with support areas for carrying chemicals therein, the shaft having a pointed terminus for easy insertion into the object, and the support areas and recess running the length of the shaft communicates without the shaft so that chemicals disposed within the support areas can gradually leach out into the object, and a temperature gradient is altered by the insertion therein of the article so that a profound difference in the chemical disposition proximate to the insertion area as well as the physical properties associated with a curing, heating, or quenching operation has been provided.

SUMMARY AND OBJECTS OF THE INVENTION

Accordingly, an object of this invention is to provide a device which can alter the internal composition of an object provided with a rod of the character described hereandafter not only chemically, but also physiologically.

If is further object of this invention to provide a device of the character described above which allows for the positive retention of chemicals within the article so as to assure their uniform disposition within the the object to be inserted, so that a uniform disposition can be assured.

Yet a further object of this invention to provide a device of the character described above which exhibits thermal properties that will alter the cure rate of an object within which the article is inserted by modifying the expected temperature gradient that would normally occur from an outside skin to a central core area.

It is yet a further object of the invention to provide a device of the character described above which is relatively inexpensive to manufacture, extremely durable in use, and safe in construction thereby eliminating any hazards associated with its manipulation.

It is still a further object of this invention to provide a device of the character described above in which a plurality of the articles are disposed in an array or matrix in such a manner that disposing the object thereon will provide plural areas influenced by the chemical composition contained within the article, as well as providing a variegated internal cross section which varies as a function of the position of the shafts thus disposed.

These and other objects will be made manifest when considering the entire patent application wherein there is provided an elongated shaft having in a preferred form a spiral groove running along the outer circumference of the shaft having support areas on top and bottom portions of the groove so that the introduction therein and retention thereof of chemicals can be easily effected and not readily dislodged by the insertion therein of the shaft within the object to be cured, thereby assuring a uniform disposition of chemicals throughout the object, and also altering the heat conductive properties of the shaft so that a temperature gradient different from that which would normally occur can be provided so as to alter the object in its structure.

These and other objects will become evident when considering the following detailed drawings and specification.

BRIEF DESCRIPTION OF THE DRAWINGS

FIG. 1 is a perspective view of the article according to the present invention;

FIG. 2 is a sectional view taken along lines 2—2 of FIG. 1;

FIG. 3 is a section view taken along lines 3—3 of FIG. 4; and

FIG. 4 is a perspective view of a plurality of the articles supported on base and oriented in a matrix like array.

DESCRIPTION OF THE PREFERRED EMBODIMENT

Referring to the drawings now, wherein like reference numerals refer to like parts throughout the various drawing figures, reference numeral 10 is directed to the insertable article for altering the cure rate and chemical composition of an object in accordance with the present invention.

The article 10 may generally be regarded as having an elongate shaft 1 provided with recess means running along the length of the shaft, which in a preferred form takes the configuration of a spiral. The recess means 3 has the form of a groove 5 running circumferentially spirally along the length of the shaft 1, provided with support areas 4 on upper and lower edges of the groove which allows the disposition therein of chemicals designed to alter the chemical composition of an object when the article 10 is thusly inserted. The support areas 4 when taken in cross section (FIG. 2) appear to have the form of pockets having an open arc area 6 communicating near the groove 5, and in a preferred form, these pockets have a circular configuration with an open arc area 6 which faces the groove. By having a shoulder 12 extending over the pocket, protection is thereby provided so that when inserting the article within the object, frictional resistance will not cause the chemical to be dispersed in an unwanted manner, but will rather assure uniform disposition of the chemical along the entire length of the shaft. In a preferred embodiment, these pockets or support areas are coextensive with the groove 5 thereby also providing upper and lower inwardly set cups running the length of the shaft. A bottom terminus of the shaft is pointed as at 7, to allow the ready insertion of the article within the object to be cured, and the extremity remote from the point 7 is provided with threads which are adapted to coact with a handle 2, or a threaded aperture 9 provided on a support base 8 wherein a plurality of such apertures are provided so as to provide a matrix or array for the insertion therein of plural shafts so that the cure rate of an object inserted upon these shafts can be varied in a plurality of ways. In a preferred form, the support base 8 is made of non heat conductive material so as to assure ease in use, while the handle 2 is made of aluminum.

In a preferred form, the shaft is formed from aluminum, and the disposition of the shaft within an object can now be provided as an illustration.

It is well known that foamed objects will have different characteristics depending upon temperature differentials that occur during the curing process so that a cold mold outer face will provide a fairly dense skin, but the center portion will have a higher degree of air contained therewithin thereby effecting its rigidity and resilience. By judicious disposition of these articles within a foamed object, a cure gradient within the object can be effected, and in addition, the chemical disposition within the recesses and support areas can alter the chemical formulation around the inserted area so as to provide striking constrast in the properties of the foamed object when compared with an object not so treated.

In another form, an article thus inserted into a food object can accelerate the cooking process if the shaft is made of heat conductive material, and the disposition of chemicals in the form of spices can alter the flavoring, tenderness, etc of the object thus cooked.

In view of the foregoing, it should be appreciated that there has been provided an article for altering the cure rate and chemical composition of an object by its insertion therewithin which in a preferred form is defined by a elongated shaft having a recess running the length thereof preferably in spiral fashion provided with support areas above and below the recess (which contains therewithin chemicals) resistant to the frictional engagement of the shaft within the object while inserted but still is capable of leaching the chemicals outwarldy therefrom to alter not only the chemical composition of the object within which the device is inserted, but also to alter the cure rate.

Further, having thus described the invention it should be apparent that numerous structural modifications are contemplated as being part of this invention as set forth hereandabove and as defined hereandbelow by the claims.

What is claimed is:

1. An insertable article for altering the cure rate and chemical composition of an object comprising in combination:

an elongate shaft,
recess means along the length of said shaft provided with support areas for carrying chemicals therein,
said shaft having one pointed terminus for facile insertion into the object,
said support areas and recess means communicating without said shaft whereby chemicals disposed therein gradually leach out into the object wherein said recess means comprise a spiral groove (5) running the length of said shaft around said shaft and wherein said support areas comprise pockets (4) along side edges of said groove, above and below, and having openings (6) facing said groove and wherein said pockets have a circular configuration in section with an open arc area facing said groove and a shoulder extending to edge portion of said groove, and linear with an outer periphery of said shaft to protect against displacement of the chemicals upon insertion, removal, or rotation of said shaft, and wherein said support area are coextensive with said groove and similarly follow a spiral path.

2. The device of claim 1 wherein said shaft is formed from heat conductive material to accelerate the curing process of the object proximate to its inserted position thereby influencing and altering the overall cure pattern and gradient of the object.

3. The device of claim 2 wherein said shaft is formed of aluminum.

4. The device of claim 1 wherein said shaft has a handle means at an extremity remote from said pointed terminus, threaded thereon.

5. The device of claim 4 wherein said handle is heat conductive.

6. The device of claim 1 wherein plural shafts extend from a support base threadedly engaging apertures in said base, thereby forming an array whereby when an object to be treated is disposed thereon, larger areas of the object can be effected.

7. The device of claim 6 wherein said base is non heat conductive.

* * * * *